United States Patent Office 3,362,355
Patented Jan. 9, 1968

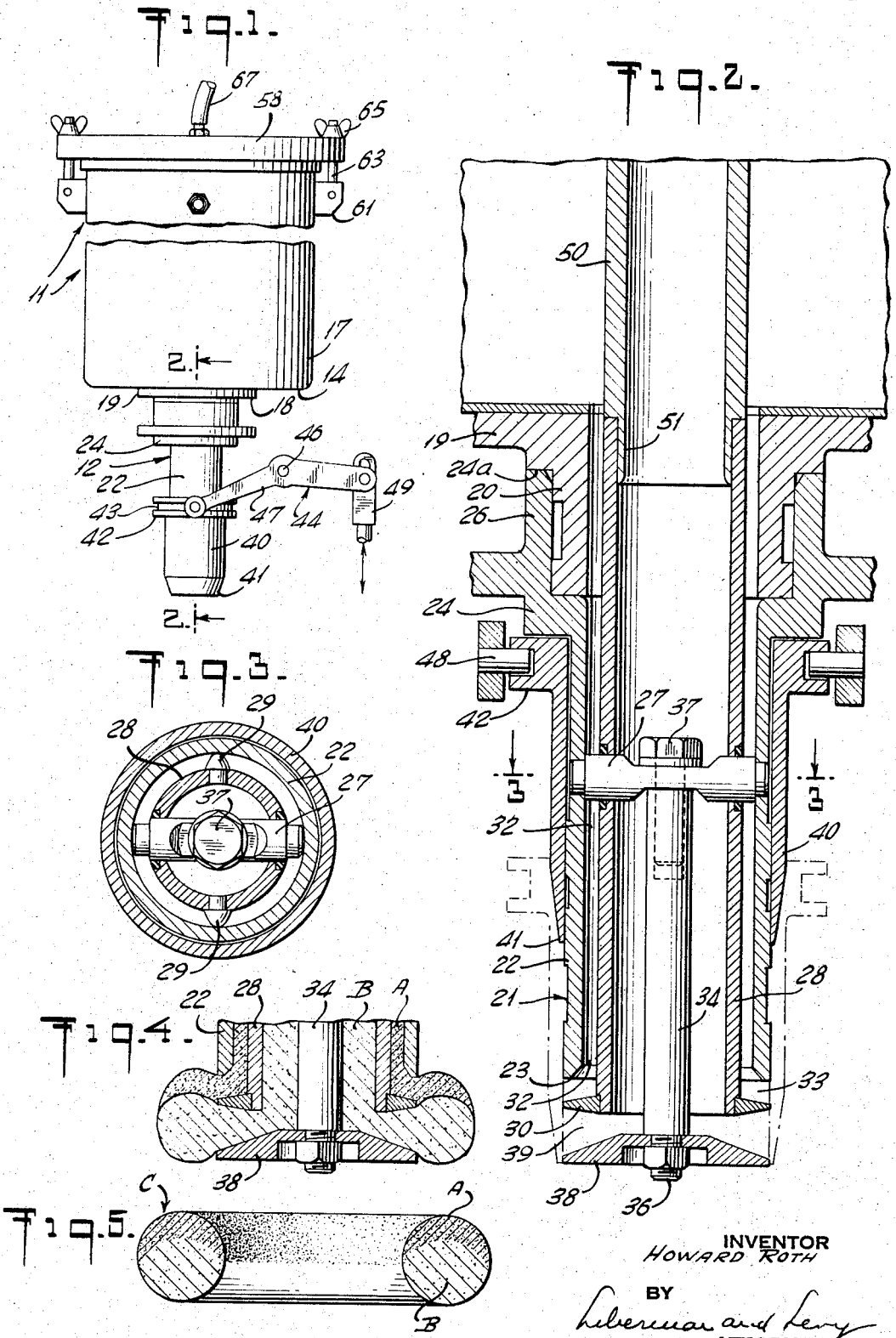

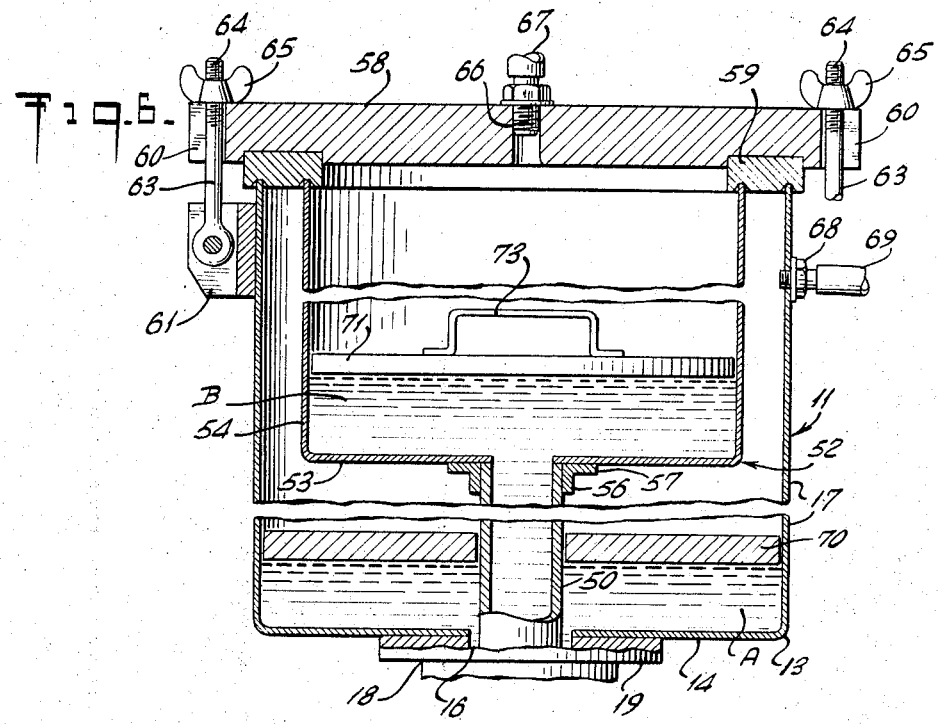
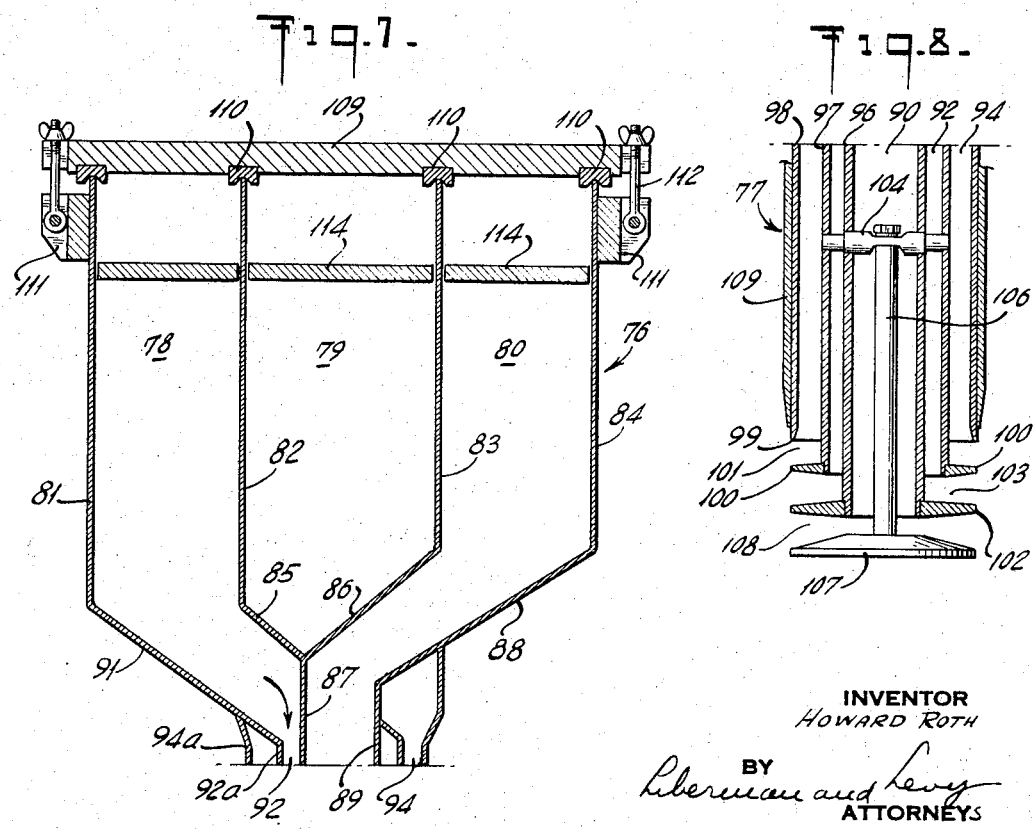

3,362,355
METHOD AND APPARATUS FOR
EXTRUDING DOUGH
Howard Roth, Bronx, N.Y., assignor to DCA Food Industries Inc., New York, N.Y., a corporation of New York
Filed Sept. 3, 1964, Ser. No. 394,128
17 Claims. (Cl. 107—1)

ABSTRACT OF THE DISCLOSURE

A vertical first nozzle is connected to a first hopper and a second nozzle extends coaxially within the first nozzle and projects below the bottom thereof and is connected to a second hopper. A disc is positioned below the first nozzle which in turn is provided at its bottom with a flange to delineate outwardly directed annular extrusion openings, and a reciprocating sleeve engages the outer nozzle to effect the opening and closing of the extrusion openings. The hoppers contain doughs of different leavening properties and the doughs are extruded through the nozzles to produce toroids with upper and lower sections formed of the different doughs which are then successively fried on opposite sides in a manner to compensate for the different leavening properties.

---

The present invention relates generally to improvements in methods and apparatus for the production of comestibles. The present invention relates in particular to an improved method and apparatus for the production of baking products such as doughnuts, pastries, and the like.

In the production of fried cakes as typified by leavening raised doughnuts, it is the conventional practice to form or extrude the dough into the shape of a torus or ring and to drop the dough ring into a hot cooking oil. The dough ring floats in the oil so that its under or first side is fried to the exclusion of any appreciable frying of the upper or second side. After sufficient cooking of the first side the dough piece is inverted in the hot oil to effect the cooking or frying of the second side. It is apparent that the opposite sides of the doughnut are subjected to different cooking procedures and conditions since the heating schedules of the two sides are at variance and the result is a doughnut which does not meet the optimum requirements. Thus, the core of the conventional first line doughnut is of less than optimum eating quality being denser than the rest of the crumb and containing less fat than the rest of the crumb. It has been found that the core of the doughnut is so formed by reason of the loss of some of the leavening in the second side of the doughnut while the first side is being fried and, in addition, there is some precooking of the second side during the frying of the first side. As a consequence, the formulation of the dough is at best a compromise since a uniform dough is employed and the optimum dough composition varies with the cooking and frying conditions. A further drawback experienced in the conventional production of fried doughnuts is the high overall density of the doughnut. This is undesirable since a factor contributing to the quality of the doughnut is the high volume to weight ratio. By reason of the different cooking conditions for opposite sides of the doughnut and the compromise dough formulation an optimum volume to weight ratio of the doughnut is not achieved by conventional methods.

It is, therefore, a principal object of the present invention to provide an improved method and apparatus for the production of comestibles.

Another object of the present invention is to provide an improved method and apparatus for the production of bakery products such as doughnuts, cakes, pastries, and the like.

Still another object of the present invention is to provide an improved method and apparatus for the production of doughnuts and other fried cakes of uniform structure.

A further object of the present invention is to provide an improved method and apparatus for producing doughnuts and other fried cakes of high quality and optimum volume to weight ratio.

Still a further object of the present invention is to provide an improved method and apparatus of the above nature characterized by simplicity, flexibility, adaptability and ease of use, maintenance and control.

The above and other objects of the present invention will become apparent from a reading of the following description taken in conjunction with the accompanying drawing wherein:

FIGURE 1 is a front fragmentary, partially sectional view of an improved dough forming apparatus embodying the present invention;

FIGURE 2 is an enlarged sectional view taken along line 2—2 in FIGURE 1;

FIGURE 3 is a sectional view taken along line 3—3 in FIGURE 2;

FIGURE 4 is a fragmentary medial vertical sectional view of the extrusion nozzle openings illustrating the extrusion of a dough piece;

FIGURE 5 is a transverse sectional view of an extruded dough piece;

FIGURE 6 is a vertical medial fragmentary sectional view of the hopper section of the apparatus of FIGURE 1;

FIGURE 7 is a vertical medial sectional view of the hopper section of another embodiment of the present invention; and FIGURE 8 is a vertical medial sectional view of the lower nozzle section thereof.

In a sense, the present invention contemplates the provision of an extrusion device comprising means delineating a pair of axially-spaced, radially directed annular extrusion openings, means connecting said extrusion openings to separate sources of fluid material under pressure, and means for opening and closing said extrusion openings.

According to a preferred form of the present apparatus the annular extrusion openings are disposed at the ends of inner and outer nozzles which are coaxially related, and there are provided a pair of separate inner and outer coaxial hoppers disposed above the nozzles and connected to the inner and outer nozzles respectively. A separable cover plate hermetically seals the hoppers from the outside and from each other, and each hopper is provided with a slidable follower member and is connected to an adjustable source of compressed air.

Another important feature of the present invention is the novel method of producing fried cakes or the like, such as doughnuts, which is effected by the use of the above apparatus. The method comprises forming a dough piece including upper and lower sections of different cooking characteristics and subjecting the upper and lower dough piece sections to different cooking conditions to compensate for these different cooking characteristics. Since, in the frying of doughnuts, the different sides are exposed to different cooking conditions, the first and second sides being sequentially immersed in the cooking oil, these varying conditions are compensated for in accordance with the present invention by varying the parameters and compositions of the dough of the two sides. These variations may effect the physical properties of the dough or the leavening properties thereof. Thus, the dough forming the second side may be slacker by containing a greater amount of water, thereby reducing the rate of skin formation and providing for a more mobile dough that can expand under the influence of a premature leavening action. The leavening reaction rate in the second side may be reduced during the frying of the first side by employing a low temperature water in the makeup of the second side dough, thereby to reduce the loss of water therein during the frying of the first side. Another form of control also in accordance with the invention is effected by providing a greater amount of leavening material in the second side which results in an increase in the rate of premature leavening action to compensate for the increased resistance thereof to suitably expand the cold dough and afford a sufficient amount of residual leavening when the second side is fried. Another expedient has been developed which may be employed to advantage; i.e., the use of a high protein strong flour to form dough of the second side in place of the usual soft wheat flour used in the first side and a large increase in the amount of leavening therein which results in a decrease in the amount of water lost and provides for expansion of the second side to an extent that has not heretofore been achievable Referring now to the drawings, and more particularly to FIGURES 1 to 6 thereof, which illustrates one form of device constructed according to and embodying the present invention, reference numeral 10 generally designates the improved apparatus, which includes an upper hopper section 11 and a lower extruder section 12. Hopper section 11 comprises an outer cylindrical open topped receptacle or vessel 13 formed with a flat bottom wall 14 having a circular central opening 16 and an upstanding vertical peripheral wall 17. A tubular coupling member 18 is affixed to the underface of bottom wall 14 coaxial with opening 16, which coupling 18 has a vertical bore communicating with the interior of receptacle 13 by way of opening 16. Coupling member 18 is provided with an upper peripheral flange 19 abutting and affixed to bottom wall 14 and a depending coaxial, externally threaded tubular section 20.

An outer nozzle member 21 depends from and is separably coaxially connected to coupling 18, and includes a bottom tubular section 22 terminating in an inner beveled edge 23 delineating a downwardly directed circular opening. The upper end of tubular section 22 is provided with an outwardly directed peripheral flange 24 having an upper shoulder 24a abutting the underface of the tubular section 20 and terminating in an internally threaded upwardly projecting collar 26 engaging the externally threaded coupling section 20. A cylindrical cross bar 27, having top and bottom medial flattened faces, extends diametrically across the upper part of the interior of nozzle tube 22 and is suitably separably secured thereto.

An inner nozzle tube 28 extends coaxially along outer nozzle tube 22 and is spaced from the inner face thereof. Tube 28 also projects above and below the top and bottom of outer nozzle tube 22. Inner tube 28 is supported by cross bar 27 and has opposite openings formed therein which are engaged by the cross bar 27 (see FIGURE 2). In order to maintain inner nozzle tube 28 in coaxial relationship with outer nozzle tube 22, a pair of outwardly directed bosses 29 is mounted on the outer face of inner nozzle tube 28 and is circumferentially spaced 90° from crossbar 27, which bosses bear on the inner face of outer nozzle tube 22. Mounted on the bottom border of the inner nozzle tube 28 is an outwardly directed annular upper valve member 30 which tapers to a peripheral edge of reduced thickness disposed below lower edge 23 of outer nozzle tube 22, and which lies substantially in the cylindrical plane of the outer face thereof. The spaced confronting faces of the inner and outer nozzle tubes 28 and 22 delineate a nozzle passageway 32 of annular transverse cross section and communicating with the interior of the outer hopper vessel 13. Passageway 32 terminates in an outwardly directed annular outlet opening 33 delineated by the bottom edge of nozzle tube 22 and the outer edge of valve annulus 30.

Supported by and depending from cross bar 27 and coaxial with the tube 28 is a cylindrical rod 34 which projects below the tube 28, and terminates in a threaded shank 36 of reduced diameter. The upper end of rod 34 has a tapped axial bore which is engaged by bolt 37 registering with a central opening in cross bar 27 to releasably secure the rod 34 thereto. A bottom valve disc 38 is mounted at the lower end of rod 34 and has a central opening registering with the threaded shank 36 and is releasably affixed to the rod 34 by a nut engaging threaded shank 36 and bearing on the base of a coaxial well formed in the underface of the valve disc. Valve disc 38 is disposed below and spaced from the bottom of the tube 28 and has a top face which is downwardly outwardly inclined to a narrow peripheral edge located at the level of the bottom face of the valve disc 38 and substantially in the plane of the cylindrical outer face of the outer nozzle tube 22. The peripheral edges of annulus 30 and disc 38 delineate an outwardly directed, lower, annular outlet opening 39 which communicates with the interior of the inner nozzle tube 28.

A closure or cutter sleeve 40 is coaxial with and slidably engages the outer face of nozzle tube 22 and is inwardly downwardly tapered along its lower outer face to a bottom sharp cutting edge 41. Sleeve 40 is vertically reciprocatable along nozzle tube 22 between a lower or closed position, in which the lower border of sleeve 40 engages the peripheral edges of valve annulus 30 and valve disc 38 to close outlet openings 33 and 39, as illustrated in FIGURE 1, and by broken line in FIGURE 2, and an upper or open position wherein the bottom edge of sleeve 40 is above the bottom edge of the nozzle tube 22, as shown in FIGURE 2 of the drawing. The upper end of the sleeve 40 is provided with an outwardly directed flange 42 having a peripheral groove 43 formed in its outer face.

In order to reciprocate sleeve 40 between its open and closed positions in any desired time schedule, there is provided an angulated lever 44 rockably supported at an intermediate elbow by a pivot pin 46. A yoke 47 is formed at one end of the lever 44 and embraces sleeve flange 42, being provided at the free ends thereof with inwardly directed pins 48 which engage the flange groove 43 at diametrically opposed points. The opposite end of lever 44 is connected to a vertical rod 49 which is reciprocated in any well known manner, for example in timed relationship with the advancing flights of an associated continuous deep frying apparatus.

A vertical tube 50 is coaxial with and is coupled to the upper end of inner nozzle tube 28 and is provided with a bottom stub section 51 which telescopes the upper part of the nozzle tube 28 and terminates at its upper end in a peripheral shoulder which rests on the upper end of the inner nozzle tube 28, the confronting faces of the stub section 51 and the nozzle tube 28 being provided with mating threads, if desired. An inner cylindrical open topped hopper vessel 52 is supported atop tube 50 and includes a circular bottom wall 53 having a central circular opening registering with the top of the tube 50, and an upstanding cylindrical wall 54 coaxial with and spaced inwardly of the outer vessel wall 17 and having a horizontal upper edge coplanar with the upper edge of the wall 17. The underface of the border of the central opening of bottom wall 53 reacts on the top face of tube 50, and a collar 56 engages the upper outer border of the tube 50 and is provided with an upper peripheral flange 57 secured to the underface of the vessel wall 53.

The inner and outer vessels 52 and 13 which delineate inner and outer hopper compartments are concurrently closed and hermetically sealed by a removable circular cover plate or lid 58 having a concentric groove formed in its underface into which is disposed and suitably secure a resilient annular gasket 59. Gasket 59 rests on the upper edges of vessels 13 and 52 to effect a pressure tight engagement therewith. Formed in the border of the cover plate 58 are a plurality of circumferentially spaced axially extending radial recesses 60. A plurality of brackets 61 are mounted on the upper outer face of the outer vessel wall 17 and are circumferentially spaced in correspondence with the recesses 60 in the cover plate. Each bracket 61 pivotally engages and supports a swing bolt 63 which separably registers with and projects above a corresponding recess 60 and terminates in a threaded section 64. A wing nut 65 engages each of the threaded section 64 and is tightened to bear on the upper face of the cover plate 58 thereby to releasably lock cover plate 58 in position.

The upper part of inner vessel 52 is connected to a source of compressed air through a suitable adjustable pressure regulating valve by way of a threaded coupling pipe 66 engaging a central tapped opening formed in cover plate 58 and a pressure hose 67 attached thereto. The upper part of the outer vessel 13 is likewise connected to a source of compressed air through an adjustable pressure regulating valve by way of a coupling pipe 68 affixed to and passing through the upper part of the vessel wall 17 and a pressure hose 69 attached thereto. Located in outer vessel 13, below upper vessel 53, is a vertically movable heavy annular follower member 70 having a central opening slidably engaging tube 50 and a periphery substantially slidably engaging the wall 17. A second heavy disc shaped follower member 71 is vertically movable in inner vessel 52, and has a periphery substantially slidably engaging the vessel wall 54 and is provided with a top handle 73.

In the application and operation of apparatus 10 described above, cover plate 58, vessel 52 and followers 70 and 71 are removed. The lower part of outer vessel 14 is filled with a first dough or batter A and follower 70 deposited on the top thereof. Inner vessel 52 is reinserted, and disposed atop tube 50 and filled with a second dough or batter B differing from the first batter A. The follower 71 is applied atop batter B. The hopper vessels 13 and 52 are then sealed by cover plate 58 and locked in position by bolts and nuts 63 and 65. Compressed air is introduced into the separate vessels 13 and 52 through the corresponding pipes and couplings.

The batters A and B are urged separately under the influence of the compressed air through the passageway 32 and nozzle tube 28 and radially outwardly through the annular outlet openings 33 and 39 respectively when the sleeve 40 is in its raised open position. The doughs A and B, as they are extruded through openings 33 and 39, merge into an integral unitary mass constituting an upper layer of dough A and lower layer of dough B. As the lever 44 is swung counterclockwise, sleeve 40 is rapidly depressed to its lower position to close extrusion openings 33 and 39 and thereby sever the batter to form a toroidal unitary piece of dough C which drops from the bottom of the extrusion nozzle 12, such dough piece having upper and lower layers of doughs A and B respectively. It should be noted that the relative and total volumes of dough A and B in the dough piece C may be varied as desired in many manners, such as by adjusting the viscosities of the doughs A and B, the pressures in the vessels 13 and 52, the timing sequency of the reciprocating stroke of the sleeve 40, the sizes of the extrusion openings 33 and 39, etc.

In accordance with the present method, the properties of batters A and B are varied in order to compensate for differences in the handling and cooking of the respective layers of the dough piece or to impart to the different layers of the end products, different properties.

Thus, in the production of deep fried doughnuts in accordance with the present process wherein the dough pieces float in the hot oil with their first side down first to cook one side, and are then inverted to float with the second side down, the doughs B an A, corresponding to the first and second sides respectively, are differently compounded or of different composition to compensate for the different cooking conditions thereof. The following examples are given merely by way of illustration of the batters or doughs which may be employed in the production of fried doughnuts, as dough A for the second or last fried side and dough B for the first or initially fried side. Two basic dry mixes were employed for producing the doughs and are designated as Formula X and Formula Y and have the following compositions, by weight:

FORMULA X

| | Percent |
|---|---|
| Flour, weat, straight grade doughnut flour | 55.4 |
| Flour, soy, defatted | 4.0 |
| Sucrose | 24.0 |
| Shortening, high ratio | 4.9 |
| Egg yolk, dried | 3.2 |
| Milk, skim, dried | 5.5 |
| Baking powder | 2.2 |
| Salt | .8 |
| | 100.0 |

FORMULA Y

| | Percent |
|---|---|
| Flour, wheat, straight grade doughnut flour | 57.0 |
| Flour, soy, defatted | 3.2 |
| Sucrose | 27.0 |
| Shortening, high ratio | 3.9 |
| Egg yolk, dried | 1.0 |
| Milk, skim, dried | 5.0 |
| Baking powder | 2.1 |
| Salt | .8 |
| | 100.0 |

*Example I*

Dough A was mixed of 5 parts of Formula X and 2.2 parts of water, blended in the conventional manner and charged into vessel 13. Dough B was mixed of 5 parts of Formula X and 2.0 parts of water, blended in the conventional manner and charged into vessel 52. The pressure in vessel 52 was regulated to 12 pounds per square inch and that in the vessel 13 to 9 pounds per square inch. Sleeve 40 was then reciprocated and the cut dough pieces as C dropped into a dep frier and cooked in the usual manner, the dough layer B cooking first and the dough layer A second. Doughnuts produced in the above manner at 12 ounces per dozen has a volume of 3.7 cc. per gram while those produced from the Formula A mix in the coventional manner at 12 ounces per dozen had a volume of only 3.2 cc. per gram.

*Example II*

Dough A was mixed of 5 parts of Formula X, 0.01 part of baking powder and 2.0 parts of water and blended in the usual manner. Dough B was similar to dough B in Example I. Dough A was charged into vessel 52 and dough B into vessel 13 and both vessels exposed to an air pressure of 12 pounds per square inch. The dough pieces then extruded, were fried in the usual manner. Doughnuts produced in the conventional manner from Formula A at 12 ounces per dozen had a volume of 3.2 cc. per gram, whereas doughnuts of the same weight produced in accordance with the present example had a volume of 3.6 cc. per gram.

*Example III*

Dough A was mixed of 5 parts of Formula X, 0.01 part of baking soda, 0.10 part of defatted soy flour and 2.1 parts water and blended in the conventional manner. Dough B was mixed of 5 parts of Formula Y and 2.0 parts of water and likewise blended in the usual manner. Vessel 13 was charged with dough A and vessel 52 with dough B, both vessel pressurized at 15 pounds per square inch and the dough pieces extruded cut and fried in the normal manner to produce doughnuts of 12 ounces per dozen. The doughnuts produced as above had a volume of 3.9 cc. per gram while doughnuts of the same weight conventionally produced with Formula X only had a volume of 3.2 cc. per gram and with Formula Y only, they had a volume of 3.1 cc. per gram.

Other expedients may be employed for varying the dough properties to compensate for the non-uniform cooking conditions. For example, dough A may be compounded with a low temperature water to produce a dough piece with a colder second side which results in less water being removed from this side during the frying of the first side and a lower leavening reaction rate in the second side during the first side frying. Further, employing high protein strong flour in place of the usual soft wheat flour and providing large increases in the amount and type of leavening in second side or dough A decreases the amount of water lost and provides for an expansion of the second side that is not otherwise possible.

While the process described above may be practiced to great advantage with the above apparatus, the apparatus may be used, as well, for producing multi-layered baking products in which the layers possess differed characteristics, for example different flavors, eating properties, etc. Further, the number of superimposed layers constituting each piece of shaped dough may be more than two by providing a corresponding number of nozzles and separate hoppers or compartments communicating therewith. Thus, in FIGURES 7 and 8 of the drawings, there is illustrated another embodiment of the present invention with which three axially spaced layer toroidal dough pieces are produced. The apparatus includes an upper pressure hopper assembly 76 and a lower nozzle assembly 77.

Hopper assembly 76 is provided with three separate side by side compartments 78, 79 and 80 respectively, compartment 78 being delineated by a first vertical side wall 81 and a transversely spaced parallel inside vertical panel 82, the second compartment 79 being delineated by the first panel 82 and a transversely spaced parallel vertical inside panel 83, and the third compartment being delineated by the second panel 83 and an opposite parallel vertical side wall 84. The compartments 78, 79 and 80 are open topped and closed by end walls. The inner compartment 79 has transversely inclined bottom walls 85 and 86 which converge to the upper edge of a depending panel 87 and the side wall 84 is provided at its bottom with an inwardly downwardly inclined wall 88 spaced from panel 86 and terminating in a depending panel 89 which delineates with panel 87 a vertical inner cylindrical outlet conduit 90. Side wall 81 is provided at its bottom with an inwardly downwardly inclined wall 91 spaced from wall 85 and the compartment 78 communicates with an intermediate annular conduit 92 delineated by the conduit 90 and an intermediate tubular wall 92a coaxial with the conduit 90. An outer coaxial annular conduit 94 delineated by the intermediate tubular wall 92a and a coaxial outer tubular wall 94a surrounds the conduit 92 and communicates with hopper inner compartment 79.

Inner conduit 90 terminates at its bottom in an inner nozzle member 96, the conduit 92 is delineated at its bottom by the nozzle member 96 and a radially spaced intermediate coaxial nozzle member 97 extending from tubular wall 92a and the outer conduit 94 is delineated at its bottom by the nozzle member 97 and a radially spaced outer coaxial nozzle member 98 extending from tubular wall 94a. Outer nozzle member 98 terminates in a downwardly directed sharp peripheral edge 99. Intermediate nozzle 97 projects below the peripheral edge 99 and is provided at its bottom with an outwardly directed coaxial valve annulus 100 having a peripheral edge coplanar with the nozzle 98 and disposed below the lower edge 99 thereof to delineate therewith an outwardly directed upper annular outlet opening 101. Nozzle 96 projects below the valve annulus 100 and is provided at its bottom with an outwardly directed coaxial valve annulus 102 having a peripheral edge coplanar with nozzle 98 and disposed below the valve annulus 100, the valve annuli 100 and 102 delineating an outwardly directed intermediate annular outlet opening 103.

A bar 104 extends diametrically across the inner nozzle 96 and supports a depending coaxial rod 106 which projects below the nozzle 96. A horizontal valve disc 107 is mounted on the bottom of the rod 106 and has an outer periphery coplanar with the outer nozzle member 98 and is disposed below the annulus 102 and delineates herewith an outwardly directed bottom annular outlet opening 108. The upper outlet opening 101 communicates by way of the conduit 94 with hopper compartment 79, the intermediate outlet opening 103 communicates by way of conduit 92 with compartment 78, and the lower outlet opening 108 communicates by way of conduit 90 with compartment 80. The hopper assembly 76 and the nozzle assembly 77 are coupled and supported in any suitable manner. A closure sleeve 109 having a tapered bottom edge slidably engages outer nozzle 98 and is reciprocated in the manner of closure sleeve 40, previously described, to successively and cyclically open and close the extrusion openings 100, 103 and 108.

The top openings to the hopper compartments are closed by a common separable lid 109 supporting on its underface resilient gaskets 110 which engage the upper edges of the walls delineating the hopper compartments to effect the hermetic sealing thereof. A plurality of brackets 111 are mounted on the outer wall of the hopper assembly 76 and support swing bolts 112 which releasably engage corresponding peripheral slots in lid 109 and are provided with wing nuts 113 bearing in the upper face of the lid 109 in closed position. Vertically slidably positioned in each of the compartments 78, 79 and 80 is a horizontal follower member 114 which substantially mates the inner periphery of the respective compartment. The upper part of each of the hopper compartments 78, 79 and 80 is connected in any suitable manner to a source of compressed air at adjustable regulated pressures.

The operation of the dough shaping and cutting apparatus last described is similar to that first described, differing therefrom only in that a three layer instead of a two layer extruded piece is formed. This provides for greater flexibility and a wider variety of end products. For example, the top and bottom layers may be formed of dough or batter and the intermediate layer of any desired filling, which may be of a type which is somewhat sensitive to the frying oil. The viscosities and pressures of the extruded materials may be adjusted to obtain any desired distribution, for example, the intermediate layer may be substantially fully enclosed by the top and bottom layers.

While there have been described and illustrated preferred embodiments of the present invention, it is apparent that numerous alterations, omissions and additions may be made without departing from the spirit thereof.

I claim:
1. The method of producing a cooked product comprising forming a unitary body of the uncooked product having a plurality of sections of different cooking properties and subjecting said sections to different cooking conditions, compensating for said different cooking properties to impart substantially similar properties to said cooked sections.

2. The method of producing a fried cake comprising forming a unitary body of dough including opposite sections having different cooking properties and successively cooking said opposite sections to compensate for said different cooking properties.

3. The method of claim 2 wherein said body of dough includes first and second of said opposite sections having respectively different leavening properties and said cooking comprises successively frying said first and second sections to compensate for said different leavening properties.

4. The method of claim 3 wherein the dough forming said second section has a higher concentration of leavening material than the dough forming said first section and said frying is effected by first immersing said first section in hot oil to cook said first section and thereafter immersing said second section in hot oil to cook said second section.

5. The method of claim 2 wherein said body of dough comprises first and second of said opposite sections, the dough forming said second section being at a lower temperature than the dough forming said first section, and said cooking comprises immersing said first section in hot oil to cook said first section and thereafter immersing said second section in hot oil to cook said second section.

6. The method of claim 2 wherein said body of dough comprises first and second of said opposite sections, the dough forming said second section containing a stronger, higher protein flour than the flour contained in the dough forming said first section, and said cooking comprises immersing said first section in hot oil to cook said first section and thereafter immersing said second section in hot oil to cook said second section.

7. The method of claim 2 wherein said body of dough comprises first and second of said opposite sections, the dough forming said second section having a higher percentage of water than the dough forming said first section and said cooking comprises immersing said first section in hot oil to cook said first section and thereafter immersing said second section in hot oil to cook said second section.

8. An extrusion device comprising means delineating a pair of axially spaced, radially outwardly directed annular extrusion openings, means connecting said extrusion openings to separate sources of fluid material under pressure, and means for opening and closing said extrusion openings.

9. An extrusion device comprising a pair of coaxial inner and outer tubular members delineating inner and outer passageways, said inner tubular member projecting below said outer tubular member, a first valve member disposed below said inner tubular member, a second valve member disposed between the lower edge of said outer tubular member and said first valve member and delineating with said outer tubular member lower edge a radially outwardly directed upper annular outlet opening communicating with said outer passageway and delineating with said first valve member a radially outwardly directed lower annular outlet opening communicating with said inner passageway, means for opening and closing said outlet openings, and means for connecting said passageways to separate sources of fluid materials under pressure.

10. An extrusion device comprising a pair of coaxial inner and outer tubular members delineating inner and outer passageways, said inner tubular member projecting below said outer tubular member, a circular first valve member disposed below and coaxial with said inner tubular member, a peripheral lip directed outwardly from the lower edge of said inner tubular member and defining an annular second valve member delineating with said outer tubular member lower edge a radially outwardly directed upper annular outlet opening communicating with said outer passageway and delineating with said first valve member a radially outwardly directed lower annular outlet opening communicating with said inner passageway, means for opening and closing said outlet openings, and means for connecting said passageways to separate sources of fluid materials under pressure.

11. An extrusion device comprising a pair of coaxial inner and outer tubular members delineating inner and outer passageways said inner tubular member projecting below said outer tubular member, a circular first valve member disposed below and coaxial with said tubular members and having an outer peripheral edge substantially coplanar with said outer tubular member, a peripheral lip directed outwardly from the lower edge of said inner tubular member and having an outer peripheral edge substantially coplanar with said outer tubular member and defining an annular second valve member delineating with said outer tubular member lower edge a radially outwardly directed upper annular outlet opening communicating with said outer passageway and delineating with said first valve member a radially outwardly directed lower annular opening communicating with said inner passageway, a closure sleeve slidably engaging said outer tubular member and axially reciprocatable thereon between a closed position in engagement with said lower valve member and an open position above said upper valve member, and means connecting said inner and outer passageways to separate sources of fluid materials.

12. The extrusion device of claim 11, wherein said fluid material sources comprise hoppers communicating with corresponding of said passageways, and means for selectively hermetically closing and opening said hoppers.

13. The extrusion device of claim 12, including means for individually connecting said hoppers to compressed air.

14. The extrusion device of claim 11, including means for periodically reciprocating said closure sleeve between an open position above the lower edge of said outer tubular member and said closed position.

15. An extrusion device comprising radially spaced, coaxial inner, outer and intermediate tubular members delineating coaxial inner, outer and intermediate passageways, said inner, intermediate and outer tubular members terminating in bottom edges at respectively successively higher levels, a circular first valve member disposed below and coaxial with tubular members and having an outer peripheral edge substantially coplanar with said outer tubular member, a peripheral lip directed outwardly from the lower edge of said inner tubular member and having an outer peripheral edge substantially coplanar with said outer tubular member and defining an annular second valve member, a peripheral lip directed outwardly from the lower edge of said intermediate tubular member and having an outer peripheral edge substantially coplanar with outer tubular member and defining an annular third valve member, said first and second valve members delineating a radially outwardly directed lower outlet opening communicating with said inner passageway, said second and third valve members delineating a radially outwardly directed intermediate outlet opening communicating with said intermediate passageway, said third valve member and the lower edge of said outer tubular member delineating a radially outwardly directed upper outlet opening communicating with said outer passageway, a closure sleeve slidably engaging said outer tubular member and axially reciprocatable thereon between a closed position in engagement with said lower valve member and an open position above said upper valve member, and means connecting said passageways to corresponding separate sources of fluid materials under pressure.

16. A dough shaping apparatus comprising a pair of transversely spaced inner and outer downwardly directed nozzle members delineating inner and outer passageways, said inner nozzle projecting below said outer nozzle, means for connecting said inner and outer passageways to sources of dough, a first valve member projecting peripherally outwardly from the bottom of said inner nozzle to delineate with said outer nozzle an upper outlet opening, a second valve member disposed below said first valve member and delineating therewith a second outlet opening, and a cutter sleeve registering with said outer nozzle and slidable between a lower position in engagement with said second valve member and an upper position above said first valve member.

17. A dough shaping apparatus comprising a first downwardly directed tubular nozzle, a second downwardly directed tubular nozzle coaxial with and radially spaced from said first nozzle and projecting below said first nozzle and delineating therewith inner and outer passageways, means connecting said inner and outer passageways to sources of dough under pressure, a first valve member supported below said second nozzle in alignment with said first nozzle, a second valve member supported at the bottom of said second nozzle above said first valve member and having an opening therein registering with said second nozzle, and a cutter sleeve slidably mounted along the first nozzle and reciprocatable between a position engaging said first and second valve members and a position above said second valve member.

References Cited

UNITED STATES PATENTS

| | | | |
|---|---|---|---|
| 516,648 | 3/1894 | Harton | 107—1 |
| 2,463,112 | 3/1949 | Kipnis | 107—54 |

WALTER A. SCHEEL, *Primary Examiner.*

J. SHEA, *Assistant Examiner.*